US006926194B2

(12) United States Patent
Lane (10) Patent No.: US 6,926,194 B2
(45) Date of Patent: Aug. 9, 2005

(54) REUSABLE BOX CONSTRUCTION FOR TRANSPORTING TREE SEEDLINGS

(76) Inventor: Mark Tracy Lane, Site 19, Box 13, Grand Prairie, Alberta (CA), T8V 2Z9

( * ) Notice: Subject to any disclaimer, the term of this patent is extended or adjusted under 35 U.S.C. 154(b) by 0 days.

(21) Appl. No.: 10/400,119

(22) Filed: Mar. 26, 2003

(65) Prior Publication Data

US 2004/0188506 A1 Sep. 30, 2004

(51) Int. Cl.$^7$ ............................................... B65D 5/00
(52) U.S. Cl. .................. 229/120; 229/122.27; 229/199; 220/4.28; 220/4.33
(58) Field of Search .................... 229/120, 5.7, 122.27, 229/122.3, 199, 123.31; 220/4.28, 4.33

(56) References Cited

U.S. PATENT DOCUMENTS

| | | | | |
|---|---|---|---|---|
| 892,570 A | * | 7/1908 | Woodill | 229/120 |
| 1,498,218 A | * | 6/1924 | Weis | 229/125.09 |
| 1,962,043 A | * | 6/1934 | Usher | 229/120 |
| 2,061,485 A | * | 11/1936 | Scheinman | 229/198.3 |
| 2,341,374 A | | 2/1944 | Gardner | |
| 2,359,335 A | * | 10/1944 | Stuart et al. | 229/182.1 |
| 2,775,389 A | * | 12/1956 | Weiner | 229/122.31 |
| 3,195,272 A | | 7/1965 | Mosher et al. | |
| 3,284,949 A | | 11/1966 | Park | |
| 3,796,342 A | * | 3/1974 | Sanders et al. | 220/6 |
| 3,907,050 A | * | 9/1975 | Mullings | 138/157 |
| 3,941,305 A | * | 3/1976 | Chipp et al. | 229/125.13 |
| 3,955,703 A | | 5/1976 | Zebarth | |
| 3,974,616 A | * | 8/1976 | Beckley | 52/656.1 |
| 4,044,910 A | | 8/1977 | Box | |
| 5,036,979 A | * | 8/1991 | Selz | 206/512 |
| 5,141,149 A | | 8/1992 | Fulton | |
| 5,265,797 A | | 11/1993 | Velge et al. | |
| 5,429,261 A | * | 7/1995 | Machino | 220/7 |
| 5,953,858 A | | 9/1999 | Loosen | |
| 6,270,007 B1 | | 8/2001 | Jensen, Jr. | |
| 6,321,978 B1 | * | 11/2001 | Tai | 229/122.24 |

* cited by examiner

Primary Examiner—Tri M. Mai
(74) Attorney, Agent, or Firm—Sturm & Fix LLP

(57) ABSTRACT

A collapsible, reusable box construction (10') for transporting horticultural products which comprises a body unit (11') including an elongated rectangular body member (20') having a plurality of independent panels (22') (23') (23') (24'), the upper and lower portions of which are further provided with mounting apertures (29) and registration slots (28); wherein the upper and lower portions of the body member (20') are adapted to be hingedly yet releasably received in oppositely faced channels (42) and (38) formed in a lid unit (13) and a base unit (12) and which are further provided with mounting apertures (49) and (33) respectively, which are adapted to receive mounting plugs (50) for connecting the lid unit (13) and the base unit (12) to the body unit (11).

Furthermore, the panels (22') (23') (23') (24') are designed to cooperate and interact with one another wherein, the end panels (23') (23') act as stiffening elements for the opposed side panels (22') and (24') which each have a horizontal notched crease (27) formed along their respective mid-lines to allow the box construction (10') to assume a folded collapsed mode for storage purposes.

19 Claims, 7 Drawing Sheets

REUSABLE BOX CONSTRUCTION FOR TRANSPORTING TREE SEEDLINGS

CROSS REFERENCE TO RELATED APPLICATIONS

Not applicable.

BACKGROUND OF THE INVENTION

1. Field of the Invention

The present invention relates to the field of special receptacles in general and in particular to a specialized reusable box construction that is specifically designed to transport tree seedlings.

2. Description of Related Art

As can be seen by reference to the following U.S. Pat. Nos. 5,265,797; 5,953,858; 4,044,910; and, 6,270,007, the prior art is replete with myriad and diverse shipping containers used to transport trees, plants and shrubs.

While all of the aforementioned prior art constructions are more than adequate for the basic purpose and function for which they have been specifically designed, they are uniformly deficient with respect to their failure to provide a simple, efficient, and practical collapsible, reusable box construction for shipping trees and shrubs that offers superior drainage and air flow circulation between adjacent stacked boxes.

In the past, young horticultural items were shipped in plastic pots or cardboard boxes which proved to be fairly detrimental to the tender stock being transported. More recently, collapsible and reusable containers have been developed but even these relatively modern approaches suffer from structural and functional inadequacies.

As a consequence of the foregoing situation, there has existed a longstanding need among shippers of horticultural items for a new and improved collapsible reusable box construction that is simple and easy to assemble and disassemble and which employs a novel locking arrangement between the bottom body and lid of the box construction; and, the provision of such an arrangement is the stated objective of the present invention.

BRIEF SUMMARY OF THE INVENTION

Briefly stated, the knock-down box construction that forms the basis of the present invention comprises in general a body unit, a base unit, and a lid unit which are secured to one another by a novel releasable mounting arrangement.

As will be explained in greater detail further on in the specification, both the lid unit and the base unit comprise framework members having raised sidewalls that define oppositely facing channels that are adapted to receive the upper and lower portion of the body unit.

In one version of the invention, the body unit includes an elongated rectangular body member having a plurality of hingedly connected panels, the upper and lower portions of which are provided with a plurality of mounting apertures that are alignable with complementary mounting apertures formed in the lid framework member and the base framework member; wherein, the alignable mounting apertures are adapted to receive removable mounting plugs.

However, in the second and preferred version of the invention, the body unit includes a body member having a plurality of independent panels which cooperate with one another to both form the basic box construction while also permitting the body member to assume a collapsed configuration between the base unit and the lid unit.

In this version, the end panels act as stiffening support elements for a pair of centrally creased opposed side panels wherein, the upper portions of the end panels are hingedly associated with the lid unit and removable from engagement with the base unit to allow the box construction to assume its collapsed configuration.

In addition, the framework members of the lid unit and the base unit are provided with registration posts that are releasably received in registration slots formed in the upper and lower portions of the body member to facilitate the alignment of the mounting apertures during the assembly of the box construction.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figures 1, 2:
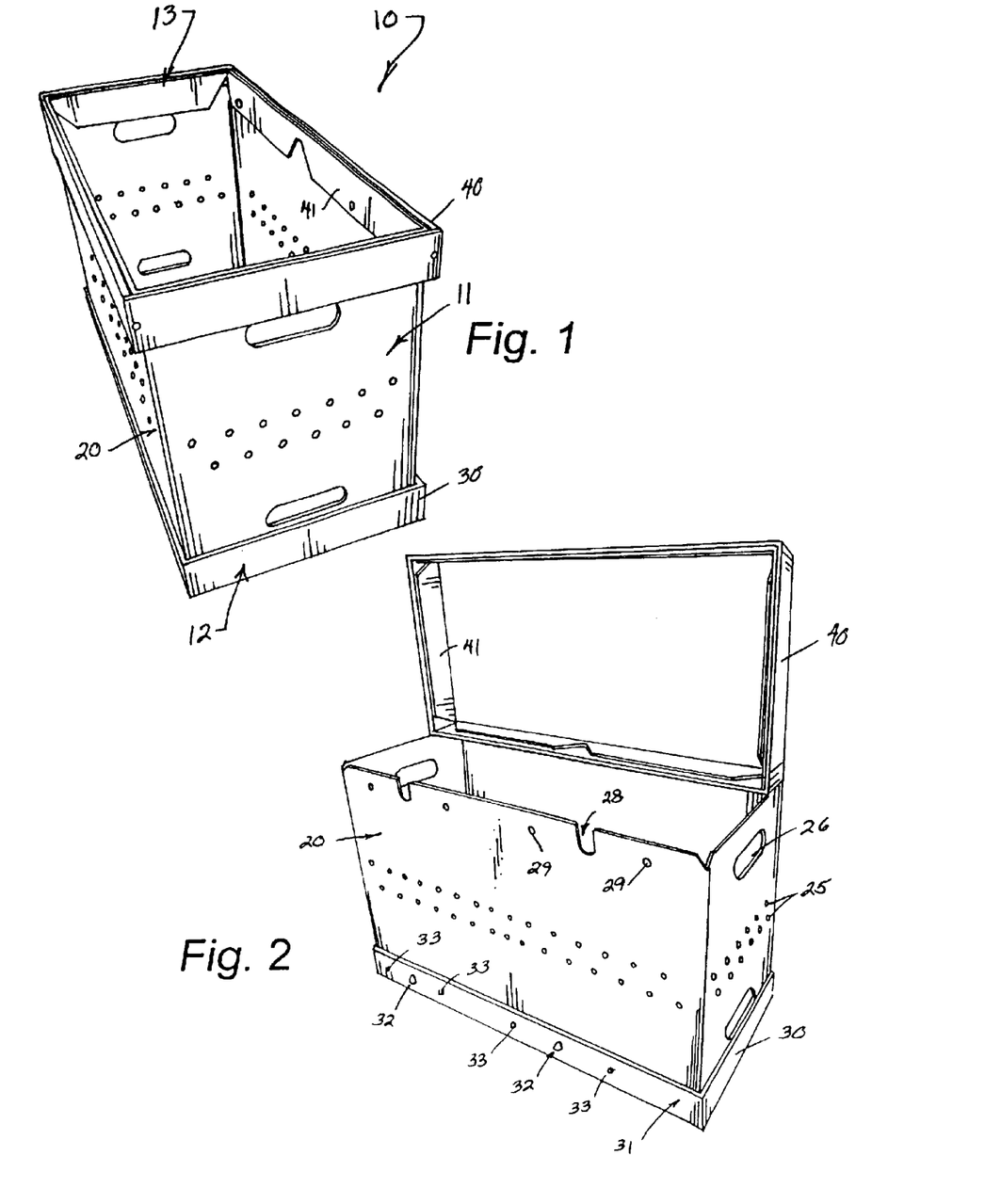
FIG. 1 is a perspective view of the first version of the box construction that forms the basis of the present invention in its closed position.
FIG. 2 is a perspective view of the box construction with the lid unit resting in an upright position relative to the body unit.

As can be seen by reference to the drawings, and in particular to FIG. 1, the first version of the collapsible reusable box construction that forms the basis of the present invention is designated generally by the reference number 10. The box construction 10 comprises in general a body unit 11, a base unit 12, and a lid unit 13. These units will now be described in seriatim fashion.

Figure 4:
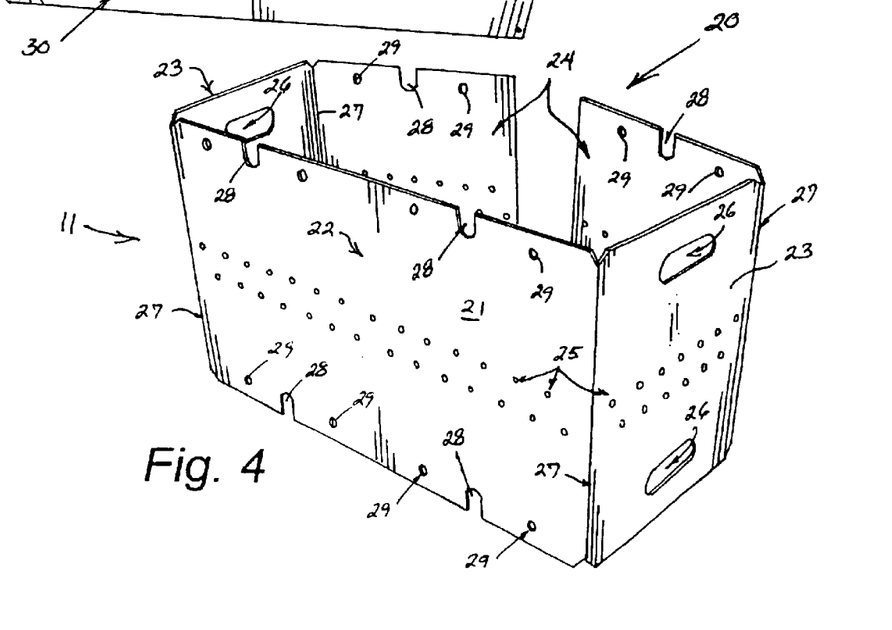
FIG. 4 is an isolated perspective view of the body unit.
Figure 5:
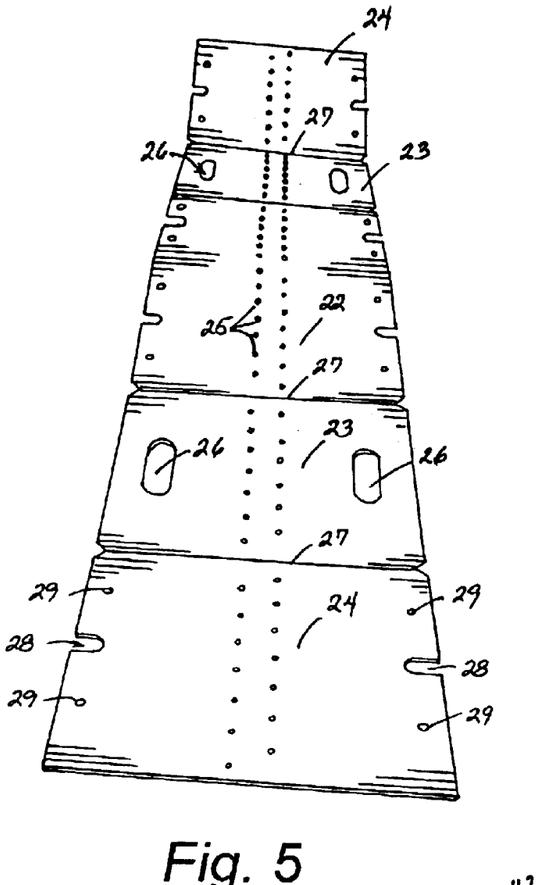
FIG. 5 is an elongated perspective view of the body unit in a generally flattened disposition.
Figure 6:
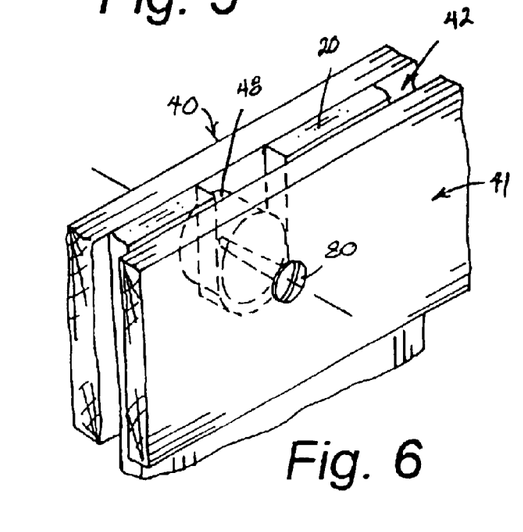
FIG. 6 is an isolated detail view of the engagement between the registration stud and groove.

As can best be appreciated by reference to FIGS. 4 and 5, the body unit 11 comprises in general an elongated generally rectangular body member 20 fabricated from a sheet of plastic 21 and including an unsegmented side panel 22, a pair of end panels 23 23 hingedly disposed on the opposite ends of the unsegmented side panel 22 and a pair of segmented side panels 24 24 wherein each of the segmented side panels is hingedly disposed on one end of the end panels 23 23.

Still referring to FIGS. 4 and 5, it can be seen that the midline of all of the panels 22 23 23 and 24 24 is provided with plural rows of spaced discrete air circulation apertures 25 and the end panels 23 23 are both provided with upper and lower hand grip slots 26 26; wherein, the hinged connection between the panels 22 23 and 24 is accomplished by a vertical notched crease arrangement designated generally as 27.

In addition, each of the segmented side panels 24 24 is provided with a pair of opposed registration slots 28 each flanked respectively by a pair of mounting apertures 29 and the unsegmented side panel 22 is provided with two pairs of opposed registration slots 28 wherein, each registration slot 28 is likewise flanked by a pair of mounting apertures 29; wherein, the purpose and function of the registration slots 28 and mounting apertures 29 will be explained in greater detail further on in the specification.

Figure 3:
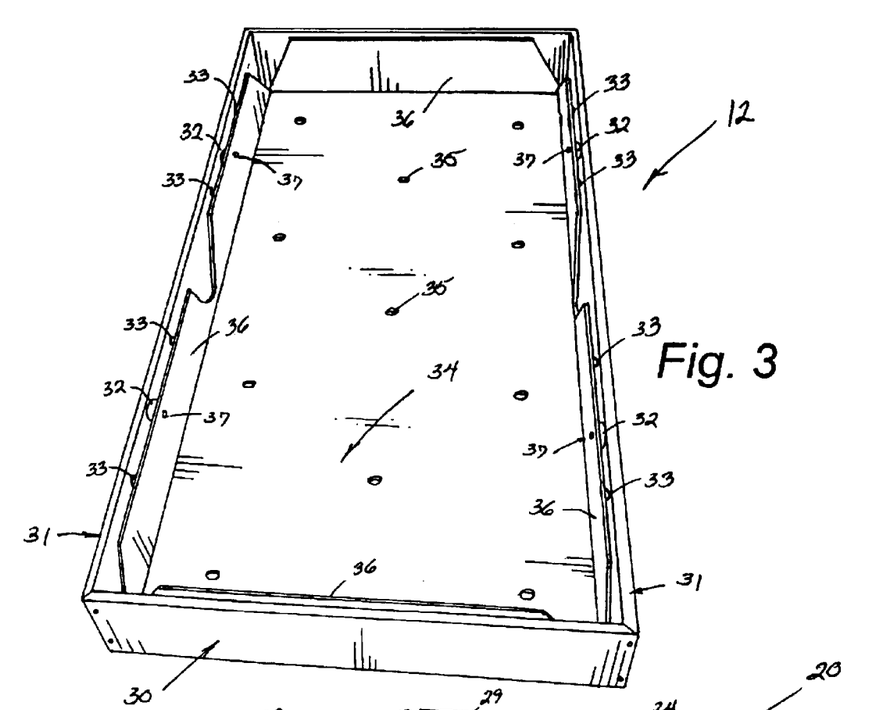
FIG. 3 is an isolated perspective view of the base unit.

Turning now to FIGS. 2 and 3, it can be seen that the base unit 12 comprises in general an open, generally rectangular base framework member 30, the elongated sides 31 of which is each provided with a pair of inwardly facing spaced registration posts 32 that are adapted to be received in the lower registration slots 28 formed in the body member 20; wherein, each of the registration posts is flanked by mounting apertures 33 that are aligned with the mounting apertures 29 formed in the lower portion of the body member 20.

In addition, the base unit 12 further includes a generally rectangular floor element 34 provided with a plurality of drain apertures 35 and having raised sidewalls 36; wherein, the sidewalls 36 are secured to the framework member 30 via conventional fasteners 37 to form a channel 38 dimensioned to receive the lower portion of the body member 20.

As can best be appreciated by reference to FIGS. 1, 2, 6, and 8, the lid unit 13 also includes an open lid framework member 40 provided with interior sidewalls 41 which are attached to the interior walls of the lid framework member 40 to form a peripheral channel 42 dimensioned to slidably receive the upper portion of the body member 20; wherein, the outer surface of the elongated opposed sides of the lid framework member 40 is provided with pairs of mounting apertures 49 which flank registration posts 48 that are secured between the lid framework member 40 and the interior sidewalls 41; wherein, the registration posts 48 are dimensioned to receive the registration slots 28 in the upper portion of the body member 20 to align the mounting apertures 29 in the body member 20 with the mounting apertures in the lid framework member 40 for reasons that will be explained presently.

Figure 7:
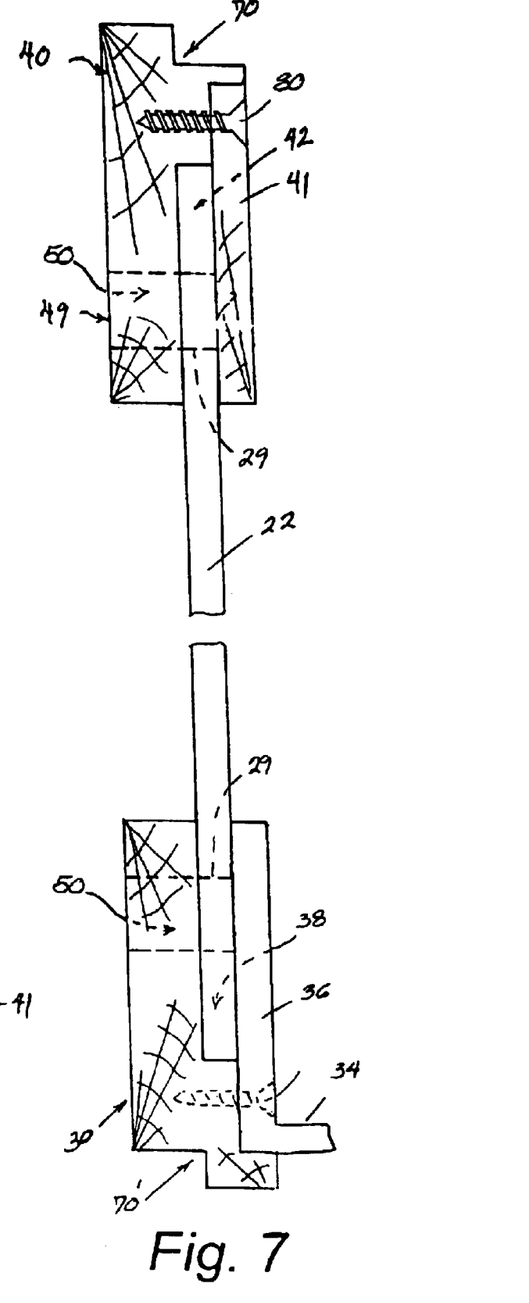
FIG. 7 is a cut-away detail view of the engagement between the lid unit, the body unit, and the base unit.
Figure 8:
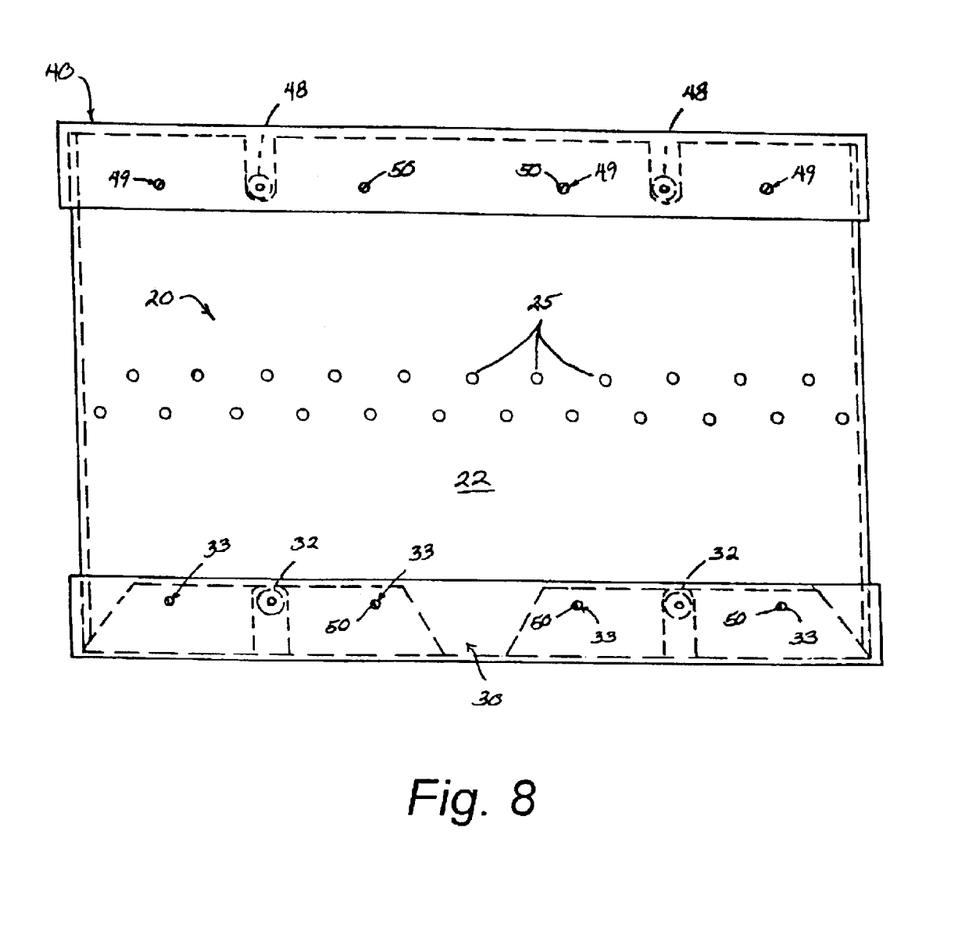
FIG. 8 is a side elevation view showing the lid unit, the body unit, and the base unit in their assembled disposition.

As can best be appreciated by reference to FIGS. 7 and 8, both the base framework member 30 and the lid framework member 40 are releasably attached to the body member 20 by a plurality of removable mounting plugs 50 which pass through the mounting apertures 33 and 49 in the base framework member 30 and the lid framework member 40 respectively and matingly engage the mounting apertures 29 in the upper and lower portions of the body member 20.

In addition, as shown in FIG. 7, both the top of the lid framework member 40 and the bottom of the base framework member 30 are provided with complimentary peripheral recesses designated generally as 70 70' wherein, the lid framework member 40 of one box construction 10 will captively engage the base framework member 30 of another box construction 10 to allow multiple box constructions 10 to be stacked upon one another in a safe and secure fashion.

As should also be noted by reference to FIG. 7, while the lid 40 and base framework members 30 are depicted as being fabricated from wood, this invention contemplates having the lid framework member 40 and associated sidewalls 41 formed integrally from molded plastic as well as the base framework member 30, sidewalls 36 and floor member 34.

Turning now to FIGS. 9 through 13, it can be seen that the second and preferred version of the box construction is designated generally as 10' wherein, both the base unit 12 and the lid unit 13 have an identical construction to the structure previously described with regard to FIGS. 1 through 8, and wherein, the body unit 11' of the preferred embodiment differs in a number of significant respects from the body unit 11 of the previous version.

Figure 9:
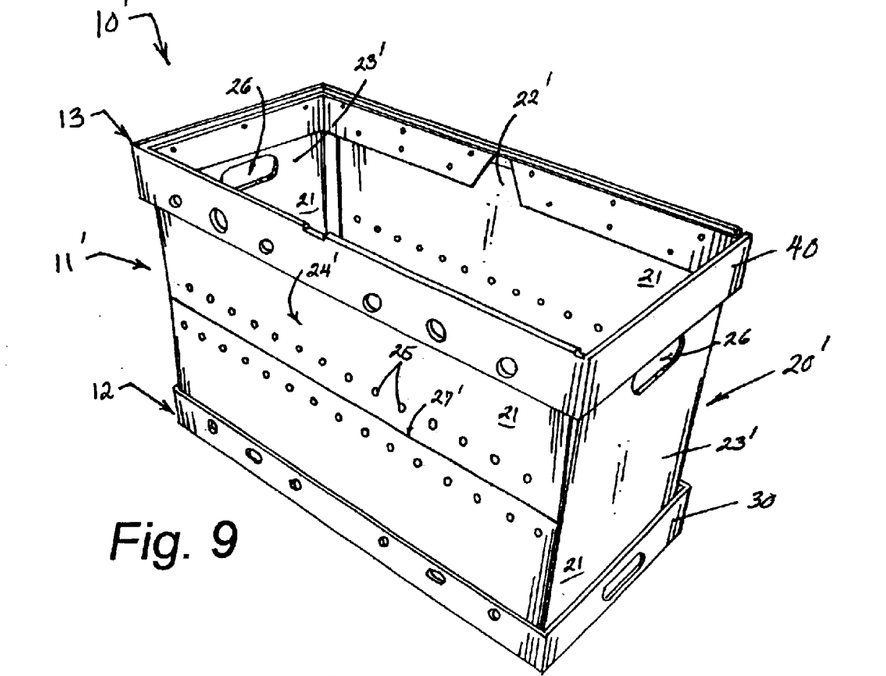
FIG. 9 is a perspective view of the second version of the preferred embodiment of the box construction in its erected mode.
Figure 13:
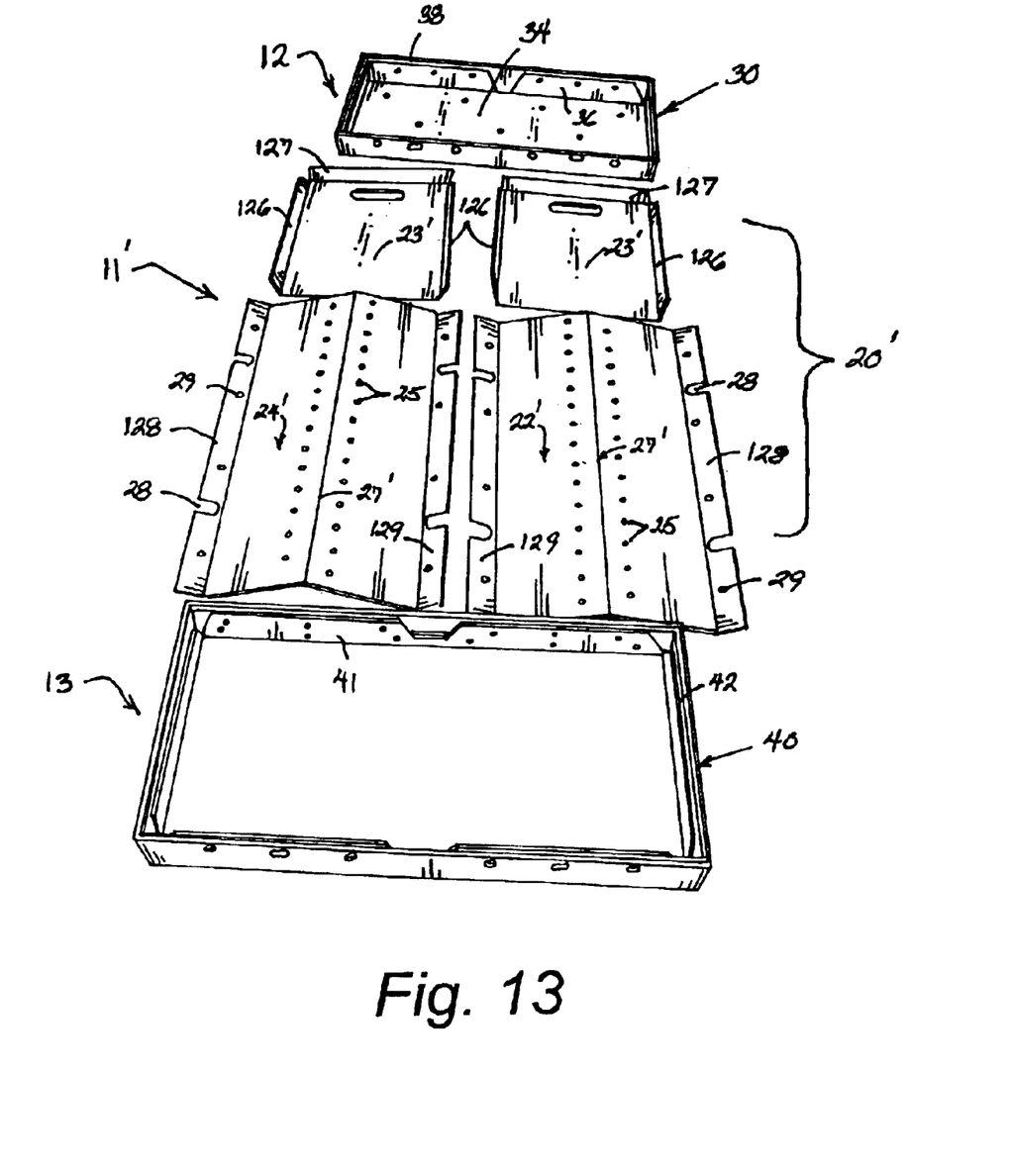

As shown in FIGS. 9 and 13, the body unit 11' comprises a body member 20' having a plurality of independent panels 22' 23' 23' 24' including a pair of mirror image side panels 22' and 24' and a pair of mirror image end panels 23' 23'.

In addition, all of the panels 22' 23' 23' and 24' are fabricated from sheets of plastic material 21 wherein, the end panels 23' 23' are each provided with a hand grip slot 26, a pair of opposed side flaps 126 and a top flap 127 the purpose and function of which will be described further on in the specification.

Furthermore, as can best be appreciated by reference to FIG. 13, each of the mirror image side panels 22' and 24' is provided with a plurality of circulation apertures 25 which flank a horizontal notched crease 27' that allow each of the side panels 22' and 24' to be folded along their respective mid-lines.

Still referring to FIG. 13, it can be seen that each of the side panels 22' and 24' is further provided with hinged top 128 and bottom 129 flaps both of which are further provided with registration slots 28 and mounting apertures 29.

By now it should be appreciated that the top 128 and bottom 129 flaps of the opposed side panels 22' and 24' are dimensioned to be received in the channels 42 and 38 in the lid member 40 and base member 30 respectively and that the top flaps of each of the end panels 23' and 23' are dimensioned to be received in the channel 42 of the lid member 40 while the bottom edges of the end panels 23' 23' are adapted to rest upon the floor element 34 of the base member 30 and the opposed side flaps 126 126 of each end panel 23' 23' are intended to provide a stiffening support to the opposite ends of each of the opposed side panels 22' 24' to maintain the box construction 10' in its fully erected mode depicted in FIG. 9.

Figure 10:
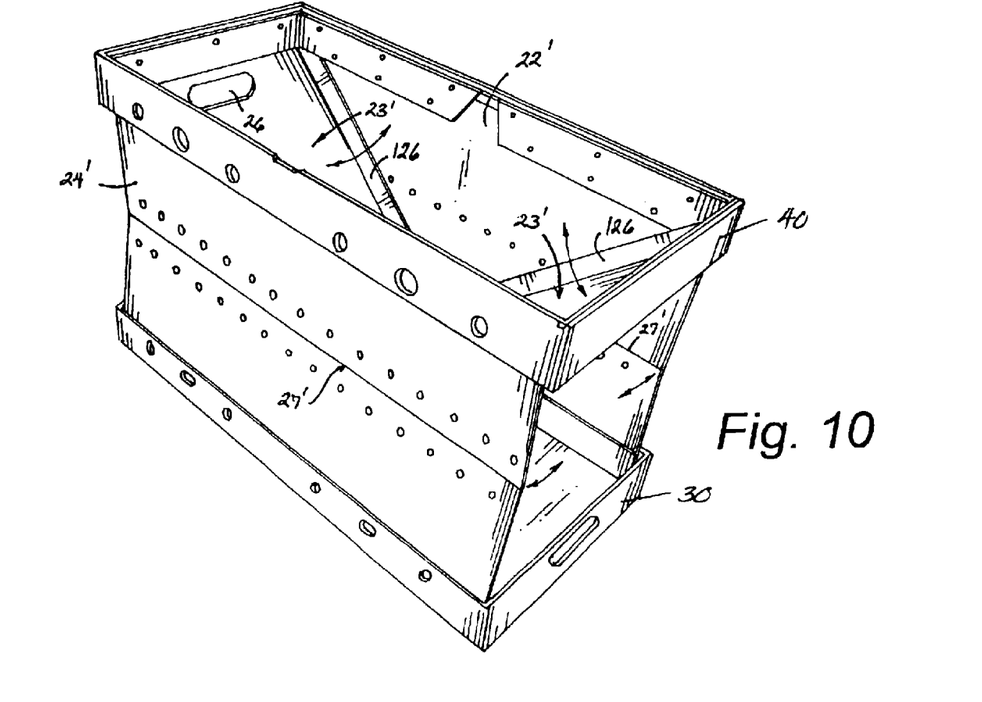
FIG. 10 is a perspective view of the second version of the preferred embodiment of the box construction in its partially collapsed mode.
Figure 11:
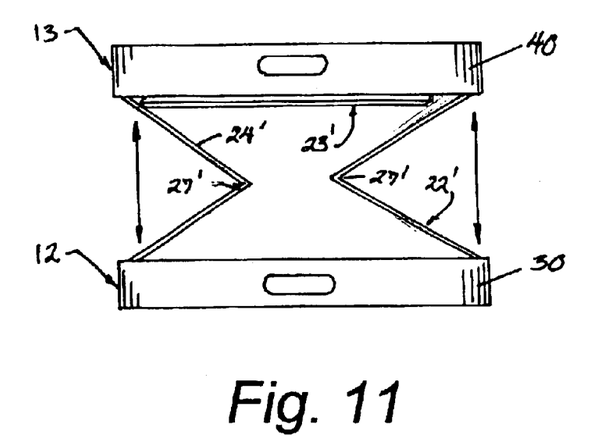
FIG. 11 is an end view of the second version in its partially collapsed mode.
Figure 12:
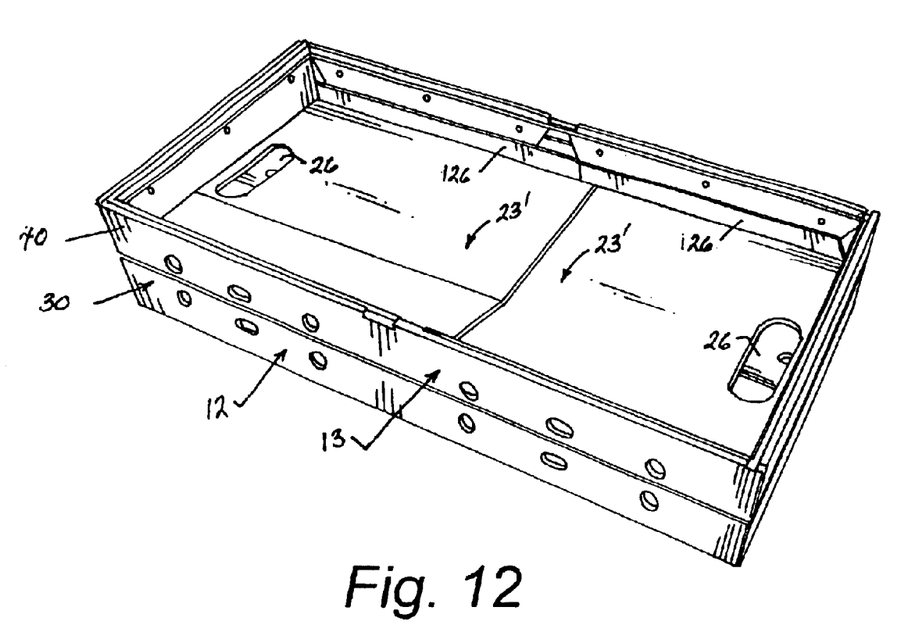
FIG. 12 is a perspective view of the second version in its fully collapsed mode; and, FIG. 13 is a perspective view of the second version of the preferred embodiment in its dis-assembled mode.

Furthermore, as shown in FIGS. 10 through 12, when it is desired to collapse the box construction 10', all that is necessary is to pivot the end panels 23' 23' relative to the lid member 40 thereby removing the stiffening influence of the end panel side flaps 126 relative to the opposed side panels 22' 24'. Then, as the end panels 23' 23' are pivoted inwardly via their top flaps 127, the opposed side panels will collapse along the horizontal notched creases 27' 27' as depicted in FIG. 11 so that the box construction 10' will assume the configuration depicted in FIG. 12.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A collapsible reusable box construction for transporting horticultural products wherein the box construction comprises a base unit including a generally rectangular base framework member having an upwardly facing interior channel formed by raised sidewalls connected to the lower portion of the base framework member;

a lid unit including an open lid framework member provided with interior sidewalls that form a peripheral channel;

a body unit including an elongated generally rectangular body member having a plurality of structurally independent panels and removable side and end, wherein the upper and lower ends of the plurality of panels are adapted to be interchangeably received in the interior channels in the base unit and the lid unit, and includes a pair of said end panels and a pair of said side panels wherein, each of the side panels is further provided with a hinged top flap and a hinged bottom flap wherein, the hinged top flap is dimensioned to be received in the peripheral channel in the lid framework member; and the hinged bottom flap is dimensioned to be received in the interior channel of the base framework member; and, wherein, the pair of end panels is each provided with a hinged top flap that is dimensioned to be received in the peripheral channel in the lid framework member.

2. The box construction as in claim 1; further comprising means for releasably attaching the body unit to the base unit and the lid unit.

3. The box construction as in claim 2; wherein, said plurality of panels includes an unsegmented side panel having opposite ends connected to a pair of end panels wherein the outboard ends of the end panels are connected to a pair of segmented side panels.

4. The box construction as in claim 3; wherein, said means for releasably attaching the body unit to the base unit and the lid unit include a plurality of mounting apertures formed in the upper and lower portions of the body member and a combined like plurality of mounting apertures formed in the lid framework member and the base framework member that are alignable with the plurality of mounting apertures in the body member wherein the opposed alignable apertures are dimensioned to receive a plurality of removable mounting plugs.

5. The box construction as in claim 4; wherein, the upper and lower portions of the body member are provided with a plurality of registration slots and the lid framework member and the base framework member are provided with a combined like plurality of registration posts that are adapted to be releasably received in said plurality of registration slots.

6. The box construction as in claim 5; wherein, the registration posts extend between the raised sidewalls and the framework members of the lid unit and the base unit.

7. The box construction as in claim 2; wherein, all of the plurality of panels are provided with air circulation apertures.

8. The box construction as in claim 2; wherein, said base unit further includes: a floor member connected to the raised sidewalls that are connected to the base framework member.

9. The box construction as in claim 8; wherein, the floor member is provided with a plurality of drain apertures.

10. The box construction as in claim 8; wherein, the top of the lid framework member and the bottom of the base framework member are provided with complimentary recesses that are adapted to allow the base framework unit to be captively engaged by the lid framework unit.

11. The box construction as in claim 2; wherein, said means for releasably attaching the body unit to the base unit and the lid unit include a plurality of mounting apertures formed in the upper and lower portions of the body member and a combined like plurality of mounting apertures formed in the lid framework member and the base framework member that are alignable with the plurality of mounting apertures in the body member wherein the opposed alignable apertures are dimensioned to receive a plurality of removable mounting plugs.

12. The box construction as in claim 11; wherein, the upper and lower portions of the body member are provided with a plurality of registration slots and the lid framework member and the base framework member are provided with a combined like plurality of registration posts that are adapted to be releasably received in said plurality of registration slots.

13. The box construction as in claim 12; wherein, the registration posts extend between the raised sidewalls and the framework members of the lid unit and the base unit.

14. The box construction as in claim 2; wherein, at least some of the plurality of panels are provided with air circulation apertures.

15. The box construction as in claim 2; wherein, the plurality of panels comprises a pair of opposed panels that is each provided with at least an upper hand grip slot.

16. The box construction as in claim 1; wherein, the plurality of side panels comprises a pair of mirror image opposed side panels.

17. The box construction as in claim 16; wherein, the mirror image opposed side panels are each provided with a horizontal notched crease that extends along their respective mid-lines.

18. The box construction as in claim 1; wherein, each of the pair of end panels is further provided with a pair of opposed hinged side flaps.

19. The box construction as in claim 18; wherein, each pair of opposed hinged side flaps is dimensioned to be received in the interior channel of the base framework member.

* * * * *